US010659363B2

United States Patent
Lim et al.

(10) Patent No.: US 10,659,363 B2
(45) Date of Patent: May 19, 2020

(54) FORWARDING TABLE MANAGEMENT (71) Applicant: Extreme Networks, Inc., San Jose, CA (US)

(72) Inventors: How T. Lim, San Jose, CA (US); Lok Y. Hui, Fremont, CA (US)

(73) Assignee: Extreme Networks, Inc., San Jose, CA (US)

( * ) Notice: Subject to any disclaimer, the term of this patent is extended or adjusted under 35 U.S.C. 154(b) by 0 days.

(21) Appl. No.: 16/205,538

(22) Filed: Nov. 30, 2018

(65) Prior Publication Data

US 2019/0173791 A1 Jun. 6, 2019

Related U.S. Application Data (60) Provisional application No. 62/593,834, filed on Dec. 1, 2017.

(51) Int. Cl.
*H04L 12/745* (2013.01)
*H04L 12/743* (2013.01)
*H04L 12/773* (2013.01)
*H04L 12/741* (2013.01)

(52) U.S. Cl.
CPC ........... *H04L 45/748* (2013.01); *H04L 45/54* (2013.01); *H04L 45/60* (2013.01); *H04L 45/7457* (2013.01)

(58) Field of Classification Search
None
See application file for complete search history.

(56) References Cited

U.S. PATENT DOCUMENTS

| | | | |
|---|---|---|---|
| 2003/0023581 A1* | 1/2003 | Davis | H04L 45/04 |
| 2015/0117459 A1* | 4/2015 | Liu | H04L 45/742 |
| | | | 370/392 |
| 2017/0237662 A1* | 8/2017 | Labonte | H04L 45/748 |
| | | | 370/392 |

* cited by examiner

*Primary Examiner* — Christine T Duong
(74) *Attorney, Agent, or Firm* — Sterne, Kessler, Goldstein & Fox P.L.L.C.

(57) ABSTRACT

Disclosed herein are system, method, and computer program product embodiments for representing a forwarding information base (FIB) in a database. An embodiment operates by determining that a first routing prefix of a first forwarding entry in the FIB is a less specific routing prefix than a second routing prefix in a second forwarding entry in the FIB. The embodiment determines that a first next hop of the first routing prefix is equal to a second next hop of the second routing prefix. The embodiment removes the second forwarding entry from the FIB. The embodiment then inserts the first forwarding entry into a database (e.g., a longest exact match (LEM) database or a longest prefix match (LPM) database) based on a prefix length of the first routing prefix of the first forwarding entry.

20 Claims, 5 Drawing Sheets

FORWARDING TABLE MANAGEMENT

CROSS-REFERENCE TO RELATED APPLICATION

The present application claims the benefit of provisional U.S. Patent Application No. 62/593,834, titled "Forwarding Table Management For The Internet" and filed on Dec. 1, 2017, which is incorporated herein by reference in its entirety.

BACKGROUND

Routers route packets across the Internet using a routing table. A routing table (or routing information base (RIB)) can include optimal paths toward individual routing prefixes. A router can insert a route into the RIB whenever the router learns of the new route. But, routers do not use the RIB to forward packets; rather, a forwarding information base (FIB) is used to forward packets.

A FIB can be a database that includes forwarding entries representing an outgoing interface and next hop information for each reachable destination routing prefix. If not all the forwarding entries can be stored in the FIB, then the router may drop traffic to destinations not programmed in the FIB.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for representing a forwarding information base (FIB) that includes routing prefixes for a network (e.g., the Internet) in one or more databases (e.g., a database implemented using associative memory).

Routers are often unable to store a FIB that includes all routing prefixes for a network (e.g., the Internet) in specialized hardware, such as on-chip ternary content-addressable memory (TCAM). These storage constraints can result in the routers' inability to forward a packet within the network. Embodiments herein solve this technological problem by compressing the FIB and then separating the routing prefixes in the compressed FIB into two different databases used to forward packets.

Figure 1:
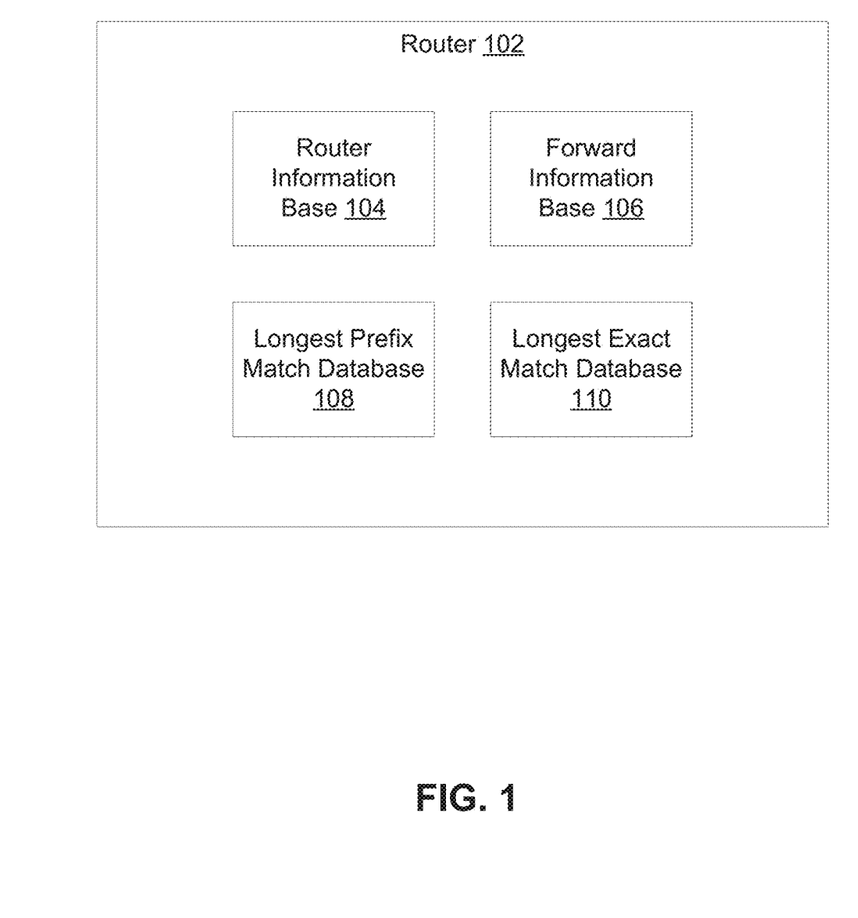
FIG. 1 is a block diagram of a router configured to represent a forwarding information base (FIB) that includes routing prefixes for a network in one or more databases, according to some embodiments.

FIG. 1 is a block diagram of a router 102 configured to represent a FIB that includes the routing prefixes for a network (e.g., the Internet) in one or more databases, according to some embodiments. Router 102 can include router information base (RIB) 104, FIB 106, longest prefix match (LPM) database 108, and longest exact match (LEM) database 110.

RIB 104 can be a routing table. For example, RIB 104 can include the entire Internet routing table. RIB 104 can also include the best paths toward individual routing prefixes. A routing prefix can represent a subnetwork, which can be a logical subdivision of the network.

In some embodiments, a routing prefix can be an Internet Protocol (IP) routing prefix. The IP routing prefix can summarize IP addresses that share some common bits at the beginning of their addresses. The IP routing prefix can be expressed in a Classless Inter-Domain Routing (CIDR) notation. In the CIDR notation, the routing prefix can be written as the first address of a network, followed by a slash character (/), and ending with the bit-length of the prefix. For example, 198.51.100.0/24 is an IP routing prefix of an IP version 4 network starting at the given address, having 24 bits allocated for the routing or network prefix, and having 8 bits reserved for host addressing. Though the routing prefix is described in terms of an IP routing prefix below, based on the description herein, the routing prefix can be associated with other types of routable network protocols.

RIB 104 can store routing information for the Internet, according to some embodiments. Router 102 can add or delete routes from RIB 104 in response to routing updates. For example, router 102 can insert a route into RIB 104 that is learned via a dynamic routing protocol (e.g., Border Gateway Protocol (BGP)). Router 102 can insert a static route into RIB 104. Router 102 can also store directly attached networks in RIB 104.

Router 102 can store multiple available routes for each routing prefix in RIB 104. Router 102 can indicate which one or more routes of the available routes is the best route for each routing prefix. Router 102 can continually recalculate the best route for each routing prefix in response to routing updates.

Router 102 can use the routing information in RIB 104 to route a packet to a particular destination. Router 102 can route a packet to a particular destination based on hop-by-hop routing. In hop-by-hop routing. RIB 104 can include, for each reachable destination (or routing prefix), the network address of the next router along the path to the destination. This network address can be referred to as a "next hop." In other words, RIB 104 can include routing prefix/next hop associations.

These associations can tell router 102 that a particular destination can be optimally reached by sending a packet to a specific router that represents the "next hop" on the way to the final destination. The next hop association can also indicate the outgoing interface to use to send the packet to the final destination.

Router 102 can use RIB 104 to forward a packet along a path to the final destination. But this is may be slow for some routing applications. To forward the packet, router 102 performs a lookup operation in RIB 104, which can be slow because some associations in RIB 104 can include next hops that are not directly connected to router 102. As a result, router 102 can perform a recursive lookup to find the next hop—this iterative process is often slow. To solve this technological problem, router 102 can use FIB 106 to forward packets.

In some embodiments, FIB 106 is a forwarding table that router 102 can use to forward packets to their next hops on the way to their final destinations. FIB 106 can include a subset of the information in RIB 104. RIB 104 can be optimized for efficient updating by routing protocols (e.g., BGP) and other control plane methods, whereas FIB 106 can be optimized for fast lookup of destination addresses.

FIB 106 can include a set of forwarding entries, according to some embodiments. Each forwarding entry can map a reachable routing prefix to next hop information. The next hop information can include the network address of the next hop and the outgoing interface to send the packet.

Router 102 can use FIB 106 to forward each individual packet that traverses the router, according to some embodiments. Router 102 can select the best matching forwarding entry for each individual packet. For example, router 102 can select the forwarding entry with the longest routing prefix that matches the destination address in the packet.

Router 102 can maintain a mirror image of the routing information included in RIB 104 in FIB 106. In some embodiments, router 102 can determine a next hop for a routing prefix stored in RIB 104. Router 102 can receive the routing prefix via advertisement from another router (e.g., one of routers 208, 210, 212, and 214 in FIG. 2) using a routing protocol (e.g., BGP). Router 102 can then store a forwarding entry in FIB 106 representing a mapping from the routing prefix to the next hop.

In some embodiments, when routes are copied from RIB 104 to FIB 106, their next hops can be resolved, outgoing interfaces can be computed, and multiple forwarding entries can be created when the next hop resolution results in multiple paths to the same destination. As a result, router 102 can use the resulting forwarding entries in FIB 106 to forward packets and thereby avoid potentially slow recursive lookups in RIB 104 to find the next hop.

If not all the forwarding entries can be stored in FIB 106, router 102 may drop packets to destinations not programmed in FIB 106. But the number of routing prefixes for the network (e.g., the Internet) can be very large. As a result, router 102 can require a large amount of memory to store the routing prefixes for the network. To solve this technological problem, router 102 can store FIB 106 in main memory (e.g., random access memory (RAM)). Main memory can be inexpensive and have storage capacity for the network's routing prefixes. But, router 102 may not be able to perform fast lookups when FIB 106 is stored in main memory that includes a large number of routing prefixes (e.g., for the Internet). In this scenario, router 102 may drop packets to destinations not programmed in FIB 106.

In some embodiments, routers address this issue by storing the FIB in specialized hardware that provides improved lookup times. For example, routers can store the FIB in ternary content-addressable memory (TCAM). But, for some applications, storing the FIB in hardware can be expensive. In addition, the hardware may have storage capacity constraints and thus unable to store the routing prefixes for the network (e.g., the Internet). Due to the storage constraints, the router may need to select a subset of routing prefixes to store in the FIB. The subset of routing prefixes may exclude the best path to forward a packet, thus resulting in inefficient packet forwarding.

In some embodiments, these technological problems are solved by compressing FIB 106 and then separating the forwarding entries in the compressed FIB 106 into two different databases: LPM database 108 and LEM database 110. Router 102 can first attempt to use LEM database 110 to forward packets based on longest exact match to routing prefixes of length /24 and /32. This can be more efficient because router 102 often forwards packets to routing prefixes of length /24 or /32. Router 102 can forward packets based on longest exact match to routing prefixes of other lengths that are greater than or less than length /24 or /32 (e.g., routing prefix lengths of /2, /4/, /8, /16, /48, /96, etc.). If there is no match in LEM database 110, router 102 can use LPM database 108 to forward packets based on longest prefix match. This can enable router 102 to forward packets that do not match forwarding entries in LEM database 110 at the expense of longer lookup times. Because the FIB 106 is compressed before programming the forwarding entries into LPM database 108 and LEM database 110, the entire routing table (e.g., the entire Internet routing table) can be represented across LPM database 108 and LEM database 110. Thus, router 102 can program forwarding entries into LPM database 108 and/or LEM database 110 based on the compressed FIB 106.

In some embodiments, LPM database 108 can be a hardware implemented database. Router 102 can store a portion of the compressed FIB 106 into LPM database 108. Router 102 can store forwarding entries with routing prefixes having different prefix lengths than /24 and /32 into LPM database 108. Router 102 can store forwarding entries with routing prefixes having different prefix lengths (e.g., different than routing prefix lengths of /2, /4, /8, /16, /48, /96, etc.) into LPM database 108. Router 102 can store the forwarding entries starting with the forwarding entries having routing prefixes of shortest length until there is no more space in LPM database 108.

In some embodiments, LEM database 110 can be a hardware implemented database. LEM database 110 can be an exact match database. Router 102 can store the portion of the compressed FIB 106 that is not stored in LPM database 108 in LEM database 110. In other words, router 102 can store forwarding entries with routing prefixes equal to /24 and /32 into LEM database 110. Router 102 can store forwarding entries with routing prefixes equal to other lengths (e.g., equal to routing prefix lengths of /2, /4, /8, /16, /48, /96, etc.) into LEM database 110. The combination of LPM database 108 and LEM database 110 can store the entire Internet routing table represented in compressed FIB 106, according to some embodiments.

In some embodiments, router 102 can forward a packet based on the information in LPM database 108 and LEM database 110. Router 102 can first check LEM database 110 for the next hop for a packet. If router 102 does not find the next hop in LEM database 110, router 102 can check LPM database 108 for the next hop for the packet. If router 102 does not find the next hop in LPM database 108, router 102 can drop the packet.

Figure 2:
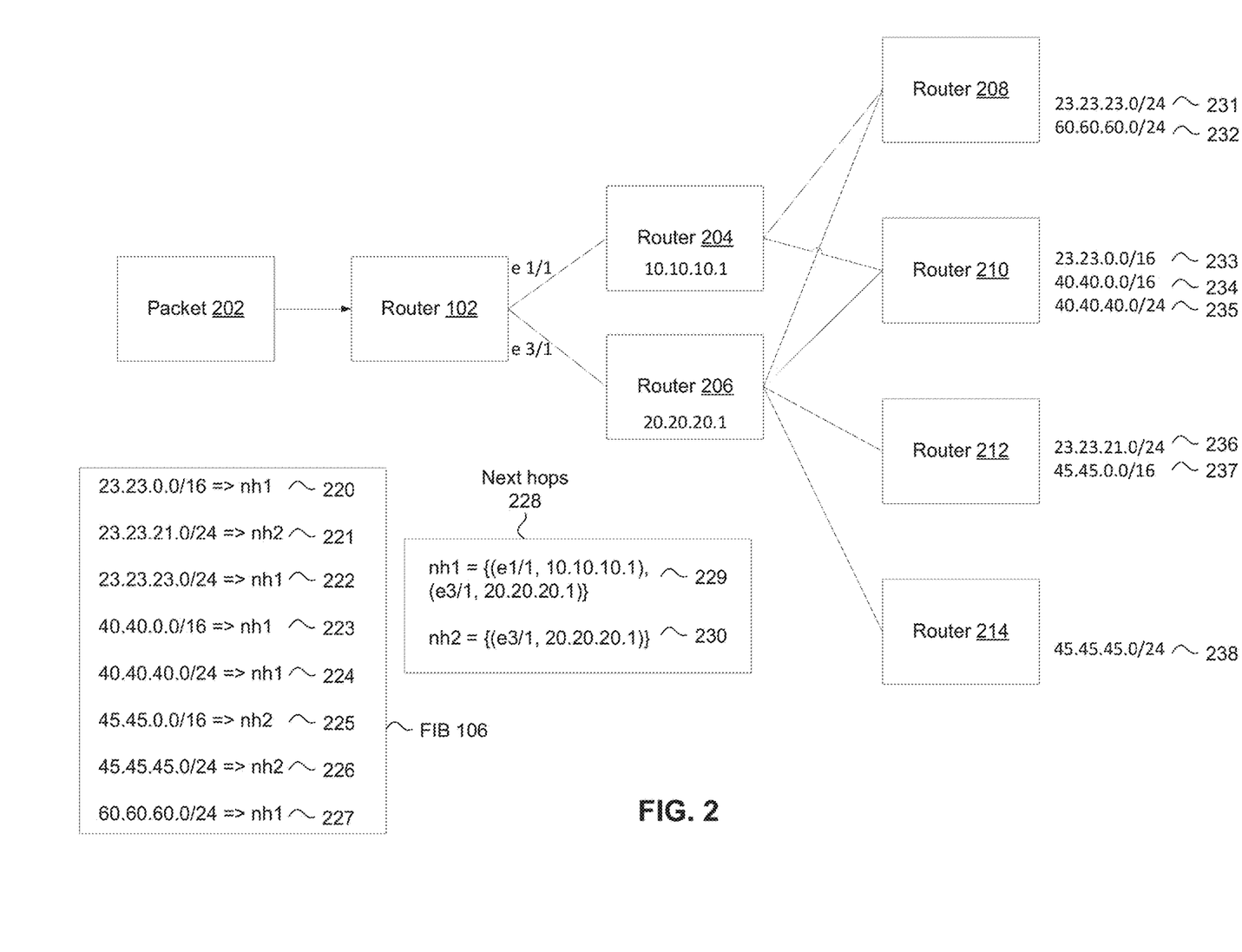
FIG. 2 is a block diagram illustrating an example FIB of a router, according to some embodiments.

FIG. 2 is a block diagram illustrating an example FIB 106 of router 102 of FIG. 1, according to some embodiments. FIG. 2 is discussed with reference to FIG. 1. In FIG. 2, router 102 can route a packet 202 according to information in FIB 106. FIB 106 can include forwarding entries including routing prefixes advertised from routers 208, 210, 212, and 214. Routers 208, 210, 212, and 214 can represent BGP neighbors.

Router 208 can advertise routing prefixes 231 and 232. Router 210 can advertise routing prefixes 233, 234, and 235. Router 212 can advertise routing prefixes 236 and 237. Router 214 can advertise routing prefix 238.

In some embodiments, router 102 can cause FIB 106 to map each advertised routing prefix to a next hop in next hops 228. Each mapping can be represented as a forwarding entry in FIB 106. For example, in FIG. 2, FIB 106 can include forwarding entries 220-227. For example, forwarding entry 220 can map routing prefix 23.23.0.0/16 to next hop nh1 (represented as next hop 229).

In some embodiments, a next hop in next hops 228 can include a mapping of an outgoing interface of router 102 to a next hop address. The next hop address can represent the next router (or destination) to which packet 202 is to be sent on the way to its final destination. The outgoing interface can represent the outgoing interface for sending packet 202 to the next router. For example, next hop 230 maps outgoing interface e 3/1 to next hop address 20.20.20.1

In FIG. 2, FIB 106 can map route 233 to next hop 229. This can be represented as forwarding entry 220. FIB 106 can map route 236 to next hop 230. This can be represented as forwarding entry 221. FIB 106 can map route 231 to next hop 229. This can be represented as forwarding entry 222. FIB 106 can map route 234 to next hop 229.

This can be represented as forwarding entry 223. FIB 106 can map route 235 to next hop 229. This can be represented as forwarding entry 224. FIB 106 can map route 237 to next hop 230. This can be represented as forwarding entry 225. FIB 106 can map route 238 to next hop 230. This can be represented as forwarding entry 226. FIB 106 can map route 232 to next hop 230. This can be represented as forwarding entry 227.

In some embodiments, a next hop can include one or more mappings of an outgoing interface to a next hop address. For example, in FIG. 2, next hop 229 can map outgoing interface e1/1 of router 102 to next hop address 10.10.10.1 of router 204, and outgoing interface e3/1 of router 102 to next hop address 20.20.20.1 of router 206.

In FIG. 2, router 102 can use the destination address of packet 202 to determine which address should next receive packet 202. As discussed above, this can be referred to as the next hop address. For example, router 102 can select a forwarding entry in FIB 106 that includes a route prefix that represents the longest prefix matching the destination address of packet 202. Router 102 can then route packet 202 to its destination by sending packet 202 to the next hop corresponding to the selected forwarding entry. Router 102 can send packet 202 to an outgoing interface for the next hop corresponding to the selected forwarding entry in FIB 106.

For example, in FIG. 2, router 102 can select forwarding entry 221 in FIB 106 for packet 202. Router 102 can then send packet 202 to next hop nh2 (represented as next hop 230 in next hops 228). In other words, router 102 can send packet 202 out outgoing interface e3/1 to next hop address 20.20.20.1 of router 206.

In another example, in FIG. 2, router 102 can select forwarding entry 220 in FIB 106 for packet 202. Router 102 can then send packet 202 to next hop nh1 (represented as next hop 229 in next hops 228). In other words, router 102 can send packet 202 out outgoing interface e1/1 to next hop address 10.10.10.1 of router 204, or out outgoing interface e3/1 to next hop address 20.20.20.1 of router 206.

As discussed, the number of routing prefixes for the network (e.g., the Internet) can be large. For example, if router 102 is used on the Internet, it can require a large amount of memory to store the routing prefixes in FIB 106. In some embodiments, router 102 can solve this technological problem by compressing FIB 106 to enable the representation of the entire routing table in hardware (e.g., in LPM database 108 and/or LEM database 110). Router 102 can compress FIB 106 based on the observation that many of the forwarding entries in FIB 106 (e.g., mappings 220-227) do not need to be stored. This is because many of the forwarding entries are redundant.

In some embodiments, router 102 can compress FIB 106 by representing two forwarding entries in FIB 106 using a single forwarding entry. For example, if FIB 106 includes a forwarding entry with a general routing prefix and a forwarding entry with a more specific routing prefix of the general routing prefix, and both routing prefixes are mapped to the same next hop, FIB 106 can avoid storing the forwarding entry for the more specific routing prefix. This is because if packet 202 matches the more specific routing prefix, it will also match the general routing prefix. Moreover, because both routing prefixes are mapped to the same next hop, the general routing prefix is sufficient by itself to enable router 102 to forward packet 202 to the next hop. Thus, router 102 can represent the two routing prefixes having the same next-hop information using just a single forwarding entry including the more general routing prefix. In other words, router 102 can keep a forwarding entry with the smallest length routing prefix common among a set of forwarding entries in FIB 106 that point to the same next hop.

For example, in FIG. 2, FIB 106 can store forwarding entries 220 and 222. But forwarding entry 222 is redundant. This is because if router 102 matches packet 202 to forwarding entry 222, router 102 can also match packet 202 to forwarding entry 220. Because both forwarding entries 220 and 222 go to the same next hop 229, router 102 can use the general forwarding entry 220 in place of the more specific forwarding entry 222. Thus, router 102 can remove forwarding entry 222 from FIB 106 to save memory space.

In another example, in FIG. 2, if packet 202 matches forwarding entry 224, it can also match forwarding entry 223 and go to the same next hop 229. Thus, router 102 can remove forwarding entry 224 from FIB 106 to save memory space. In another example, if packet 202 matches forwarding entry 226, it can also match forwarding entry 225 and go to the same next hop 230. Thus, router 102 can remove forwarding entry 226 from FIB 106 to save memory space.

Figure 3:
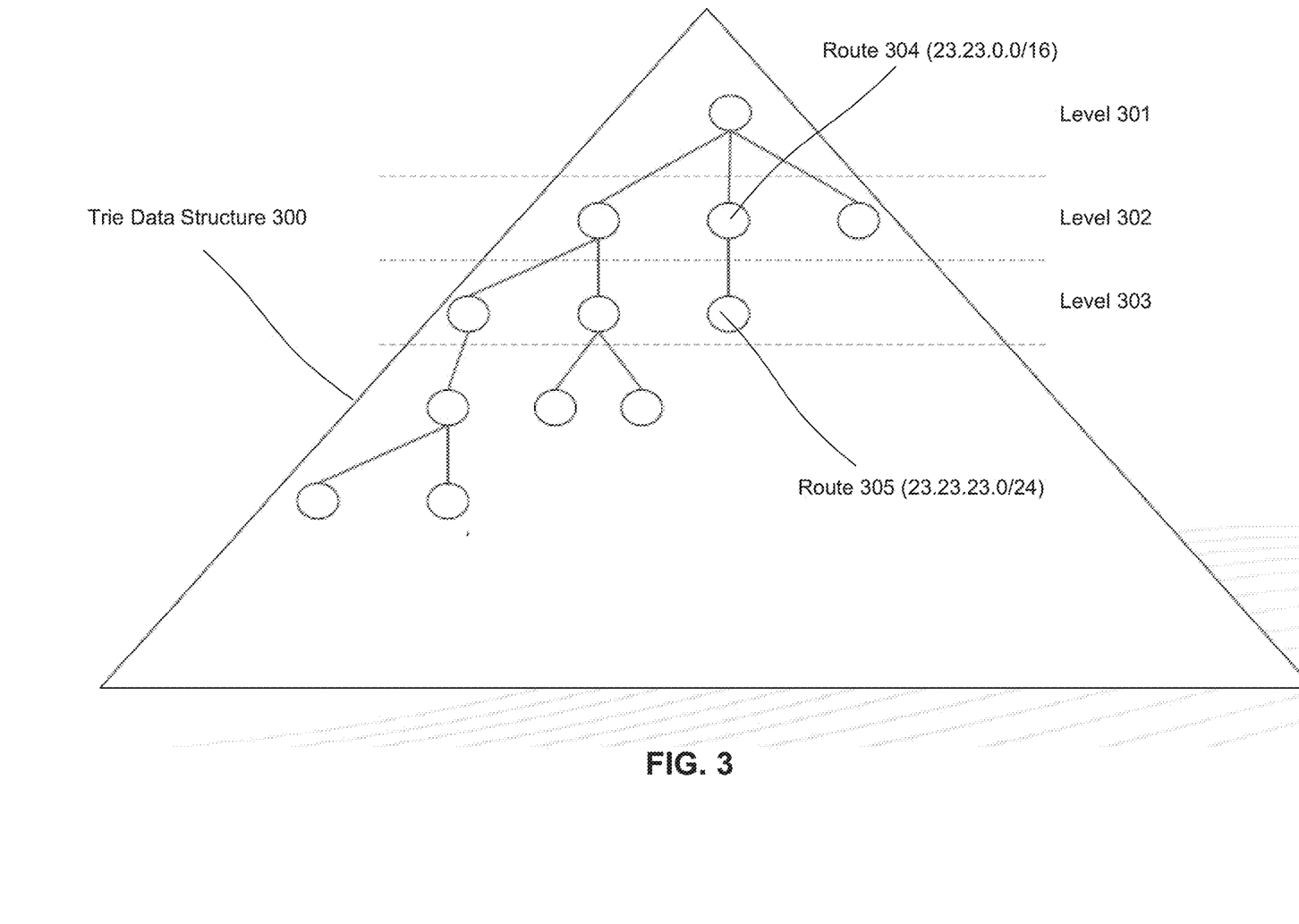
FIG. 3 is a block diagram illustrating an example FIB of a router organized using a trie data structure to enable compression of the FIB, according to some embodiments.

FIG. 3 is a block diagram illustrating an example of FIB 106 of router 102 organized using a trie data structure to enable compression of FIB 106, according to some embodiments. FIG. 3 is discussed with reference to FIGS. 1 and 2. In FIG. 3, router 102 can organize forwarding entries in FIB 106 using trie data structure 300. A trie data structure can be a type search tree.

In FIG. 3, trie data structure 300 can have one or more levels. The top of trie data structure 300 can be a default route (e.g., routing prefix /0). This can be represented as level 301. The top route of trie data structure 300 can have the shortest routing prefix length.

The next level of trie data structure 300 can be level 302. The routing prefixes in level 302 can be children of the top route in level 301. In other words, the top route of trie data structure 300 can be a more general routing prefix that includes the routing prefixes in level 302. For example, one or more routing prefixes in level 302 can have the default routing prefix in level 301 as their parent.

The next level of trie data structure 300 can be level 303. The routing prefixes in level 303 can be children of a routing prefix in level 302. In other words, a routing prefix of trie data structure 300 at level 302 can be a more general routing prefix that includes the routing prefixes in level 303. For example, one or more routing prefixes in level 303 can have a routing prefix of trie data structure 300 at level 302 as their parent.

In some embodiments, router 102 can organize FIB 106 using trie data structure 300 to enable the compression of FIB 106 based on redundancy in the forwarding entries in FIB 106 (e.g., forwarding entries 220-227 in FIG. 2). For example, organizing FIB 106 using trie data structure 300 can enable compression by enabling router 102 to identify in FIB 106 a general routing prefix and a more specific routing prefix of that general routing prefix which are both mapped to the same next hop. Router 102 can mark the more specific routing prefix for compression.

For example, in FIG. 3, route 304 can represent routing prefix at level 302. Route 304 can have the default routing prefix (e.g., 0.0.0.0/0) as its parent. Route 305 can represent a routing prefix at level 303. Route 305 can have a level 302 routing prefix as its parent. In this case, route 305 can have route 304 as its parent. In other words, route 304 can be a general routing prefix and route 305 can be a more specific routing prefix of that general routing prefix. To compress FIB 106, router 102 can determine if route 304 and route 305 both have the same next hop. If they do, router 102 can mark route 305 for compression.

In some embodiments, router 102 can compress FIB 106 in response to a route being copied from RIB 104 to FIB 106. For example, router 102 can add a forwarding entry corresponding to a level L routing prefix R to FIB 106. Router 102 can compare the next hop of routing prefix R with the parent routing prefix of R (e.g., level L−1 route prefix $R_p$). If router 102 determines that both routing prefix R and routing prefix $R_p$ have the same next hop, router 102 can mark the forwarding entry corresponding to routing prefix R for compression. Router 102 can then repeat the same compression process on all children routing prefixes at level L+1 (e.g., $R_{c1}$ to $R_{cn}$). Router 102 can mark forwarding entries corresponding to the children routing prefixes for compression depending on whether their next hops are the same as the newly inserted routing prefix R.

Router 102 can reduce the size of FIB 106 using this compression process. For example, in some cases, the above compression process can compress FIB 106 down to 40% of its original size (e.g., from 655 K forwarding entries to 255 K forwarding entries).

In some embodiments, when router 102 marks a forwarding entry corresponding to a routing prefix for compression, router 102 can remove the forwarding entry from FIB 106. In some other embodiments, when router 102 marks a forwarding entry for compression, router 102 can avoid inserting the forwarding entry into either LPM database 108 or LEM database 110.

In some embodiments, router 102 can generate a hardware instruction for either LPM database 108 or LEM database 110. This hardware instruction can program LPM database 108 or LEM database 110 to store a forwarding entry in FIB 106.

In some embodiments, router 102 can reduce the size of FIB 106 using this compression process. But even after compressing FIB 106, FIB 106 may still be too large to store in a database. For example, FIB 106 may still be too large to store in a database implemented using associative memory. To overcome this technological problem, in some embodiments, router 102 can separate the forwarding entries in the compressed FIB 106 into two databases: LPM database 108 and LEM database 110. Router 102 can then perform packet forwarding using LPM database 108 and LEM database 110.

In some embodiments, LPM database 108 can be a database implemented using associative memory. For example, LPM database 108 can be database implemented using TCAM. LPM database 108 can be implemented using various other associative memory systems. LPM database 108 can be implemented using various other types of specialized hardware. Router 102 can store a portion of the compressed FIB 106 into LPM database 108. In some embodiments, router 102 can store forwarding entries with routing prefixes different than /24 and /32 into LPM database 108. Router 102 can store the forwarding entries starting with the forwarding entries having routing prefixes of shortest length until there is no more space in LPM database 108. LPM database 108 can store forwarding entries with routing prefixes having prefix lengths different than other prefix lengths.

In some embodiments. LEM database 110 can be a hardware implemented database implemented using associative memory. For example, LEM database 110 can be database implemented using TCAM. LEM database 110 can be implemented using various other associative memory systems. LEM database 110 can be implemented using various other types of specialized hardware. Router 102 can store the portion of the compressed FIB 106 that is not stored in LPM database 108 in LEM database 110. In other words, router 102 can store forwarding entries with routing prefixes equal to /24 and /32 into LEM database 110. LEM database 110 can store forwarding entries with routing prefixes having prefix lengths of other lengths. Moreover, the combination of LPM database 108 and LEM database 110 can store the entire network (e.g., the Internet) routing table represented in compressed FIB 106.

In some embodiments, router 102 can separate the forwarding entries from compressed FIB 106 into LPM database 108 and LEM database 110. Router 102 can separate the forwarding entries from compressed FIB 106 into LPM database 108 and LEM database 110 based on prefix length. For example, router 102 can program forwarding entries with routing prefixes having prefix lengths of /24 and /32 into LEM database 110. Router 102 can then program the remaining forwarding entries from compressed FIB 106 into LPM database 108. Router 102 can program forwarding entries with routing prefixes of other lengths into LEM database 110. Router 102 can also program the remaining forwarding entries from compressed FIB 106 into LPM database 108 based on other prefix lengths.

In some embodiments, router 102 can break down forwarding entries with routing prefixes of prefix length /23 from compressed FIB 106 into two forwarding entries with routing prefixes of prefix length /24 prior to separating the forwarding entries into LPM database 108 and LEM database 110. For example, router 102 can break down a forwarding entry with a routing prefix of 23.23.22.0/23 into forwarding entries with routing prefixes: 23.23.22.0/24 and 23.23.23.0/24. The two routing prefixes of 23.23.22.0/24 and 23.23.23.0/24 can together be equivalent to the routing prefix 23.23.22.0/23. After breaking down the forwarding entries with routing prefixes of prefix length /23, router 102 can program LEM database 110 using the resulting forwarding entries with routing prefixes of prefix length /24. Router 102 can break down forwarding entries with other length routing prefixes (e.g., prefix length of /2, /4, /8, /16, /48, /96, etc.) from compressed FIB 106 into two forwarding entries with routing prefixes that together are equivalent to the original forwarding entry.

In some embodiments, router 102 can program forwarding entries into LPM database 108 using the forwarding entries not programmed into LEM database 110. Router 102 can program the forwarding entries into LPM database 108 starting from the forwarding entries having the shortest routing prefixes. Router 102 can continue to program the forwarding entries into LPM database 108 until there is no more memory to store forwarding entries in LPM database 108.

Router 102 can determine where to forward a packet (e.g., packet 202) by performing a lookup in either LPM database 108 or LEM database 110. In some embodiments, router 102 can first perform a lookup in LEM database 110 by matching the destination address of the packet to routing prefixes of forwarding entries in LEM database 110. If router 102 cannot match the destination address of the packet with routing prefixes of the forwarding entries in LEM database 110, router 102 can then perform a lookup in LPM database 108. For example, router 102 can attempt to match the destination address of the packet with the routing prefixes of the forwarding entries in LPM database 108. If router 102 cannot match the destination address of the packet with the routing prefixes of the forwarding entries in LPM database 108, router 102 can drop the packet.

Figure 4:
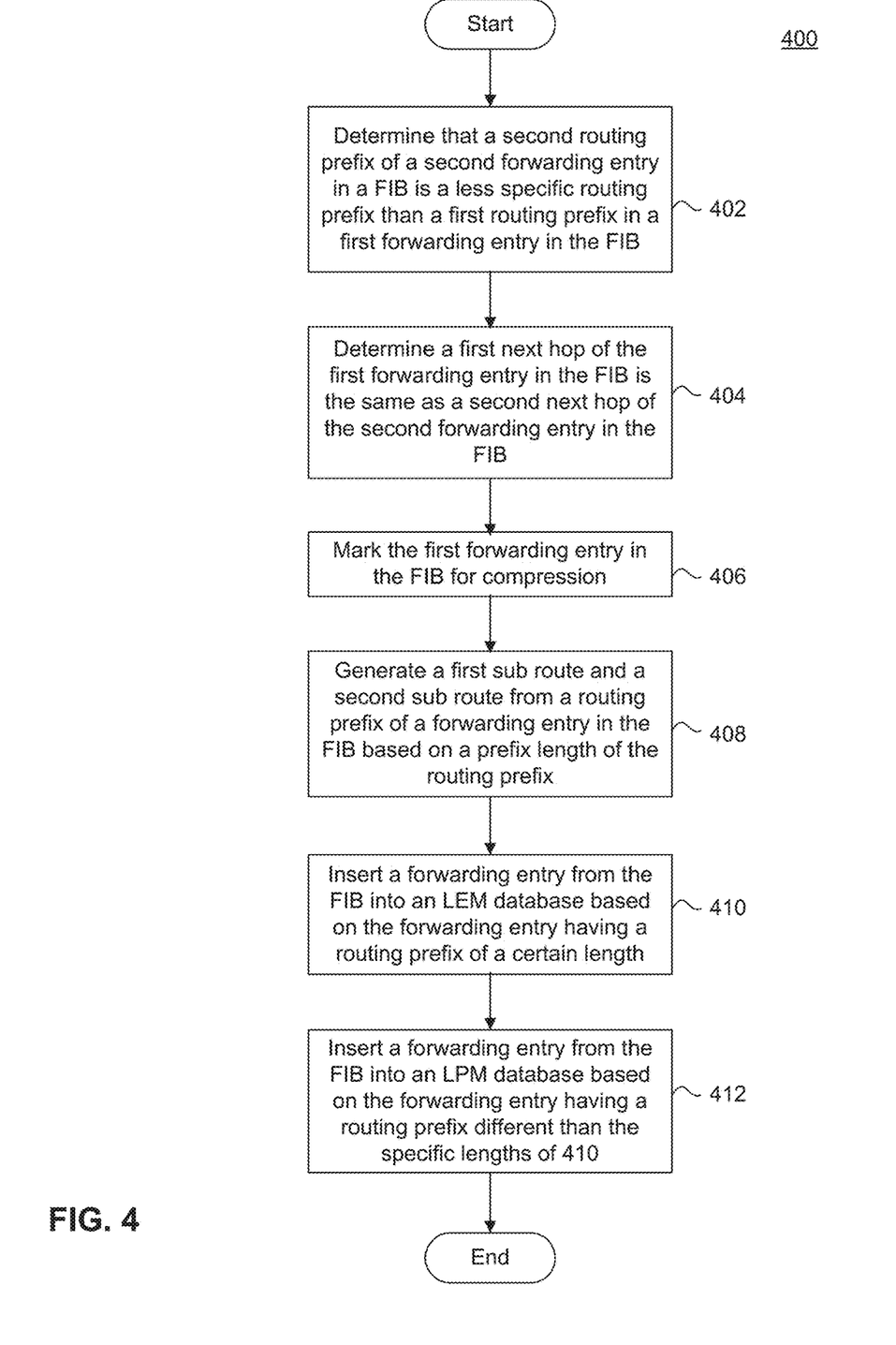
FIG. 4 is a flowchart illustrating a process for representing a FIB that includes routing prefixes for a network in one or more databases, according to some embodiments.

FIG. 4 is a flowchart for a method 400 for representing a FIB including the routing prefixes for the network (e.g., the Internet) in one or more databases, according to some embodiments. Method 400 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4.

Method 400 shall be described with reference to FIGS. 1 and 2. However, method 400 is not limited to that embodiment.

In 402, router 102 determines that a second routing prefix of a second forwarding entry in FIB 106 is a less specific routing prefix than a first routing prefix in a first forwarding entry in FIB 106. In some embodiments, router 102 can perform this determination by representing FIB 106 using a trie data structure (e.g., trie data structure 300). For example, router 102 can determine that the second routing prefix is a less specific routing prefix than the first routing prefix if the second routing prefix is represented as a parent node (or parent routing prefix) of the first routing prefix in the trie data structure.

In 404, router 102 determines whether a first next hop of the first routing prefix of the first forwarding entry in FIB 106 is the same as a second next hop of a second routing prefix of the second forwarding entry stored in FIB 106.

In 406, router 102 marks the first forwarding entry in FIB 106 for compression based on the determination that the first next hop of the first routing prefix is the same as the second next hop of the second routing prefix. Router 102 can remove the first forwarding entry marked for compression from FIB 106. Router 102 can also avoid inserting the first forwarding entry into LPM database 108 or LEM database 110.

In 408, router 102 can optionally generate a first sub routing prefix and a second sub routing prefix from a routing prefix in a forwarding entry based on a prefix length of the routing prefix. In some embodiments, router 102 can generate the first sub routing prefix and the second sub routing prefix from the routing prefix in the forwarding entry based on the routing prefix having a prefix length of /23. The resulting first sub routing prefix and the second sub routing prefix can be of prefix length /24.

In some other embodiments, router 102 can generate the first sub routing prefix and the second sub routing prefix from the routing prefix in the forwarding entry based on the routing prefix having a prefix length of /31. The resulting first sub routing prefix and the second sub routing prefix can be of prefix length /32.

In some embodiments, router 102 can create respective forwarding entries for the first sub routing prefix and the second routing prefix. The respective forwarding entries can map the first sub routing prefix and the second routing prefix to the next hop associated with the original forwarding entry. Router 102 can insert the respective forwarding entries into FIB 106. Router 102 can remove the original forwarding entry from FIB 106.

In 410, router 102 can optionally insert a forwarding entry from FIB 106 into LEM database 110 based on the forwarding entry having a routing prefix of one or more specific lengths. For example, router 102 can insert the forwarding entry into LEM database 110 based on the routing prefix of the forwarding entry having a prefix length of /24 or /32.

In 412, router 102 can optionally insert a forwarding entry from FIB 106 into LPM database 108 based on the forwarding entry having a routing prefix having a prefix length different than one or more specific lengths from operation 410. For example, router 102 can insert the forwarding entry into LPM database 108 based on the routing prefix of the forwarding entry having a prefix length different than /24 or /32.

Figure 5:
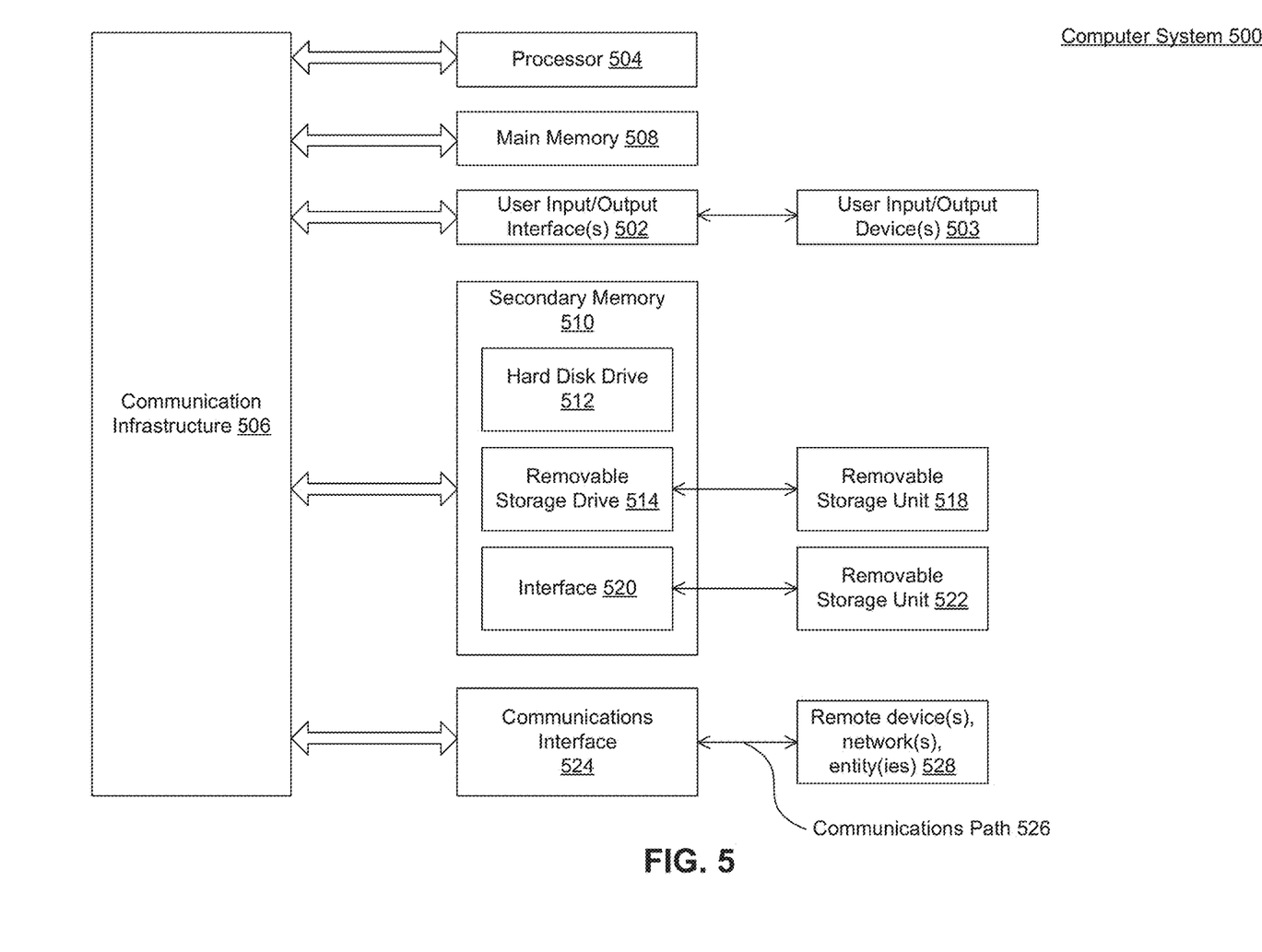
FIG. 5 is an example computer system for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings included in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed.

Also, alternative embodiments can perform functional blocks, steps, operations, methods, etc. using orderings different than those described herein.

References herein to "one embodiment," "san embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for representing a forwarding information base (FIB) in a database, comprising:
   determining, by at least one processor, that a first routing prefix of a first forwarding entry in the FIB is a less specific routing prefix than a second routing prefix in a second forwarding entry in the FIB;
   determining, by the at least one processor, a first next hop of the first routing prefix is equal to a second next hop of the second routing prefix;
   removing, by the at least one processor, the second forwarding entry from the FIB based on the determination that the first next hop of the first routing prefix is equal to the second next hop of the second routing prefix; and
   inserting, by the at least one processor, the first forwarding entry into a longest exact match (LEM) database or a longest prefix match (LPM) database based on a prefix length of the first routing prefix of the first forwarding entry.

2. The method of claim 1, wherein the first next hop comprises a next hop address and an outgoing interface.

3. The method of claim 1, wherein the inserting comprises inserting the first forwarding entry into the LPM database based on the prefix length of the first routing prefix of the first forwarding entry being different than 24 bits or 32 bits.

4. The method of claim 1, wherein the inserting comprises inserting the first forwarding entry into the LEM database based on the prefix length of the first routing prefix of the first forwarding entry being 24 bits or 32 bits.

5. The method of claim 1, wherein each of the LEM and LPM databases comprise ternary content-addressable memory (TCAM).

6. The method of claim 1, further comprising:
   generating a first sub routing prefix and a second sub routing prefix from a third routing prefix of a third forwarding entry in the FIB based on a prefix length of the third routing prefix being 23 bits.

7. The method of claim 6, further comprising:
   inserting the first sub routing prefix and the second sub routing prefix into the LEM database.

8. A system, comprising:
   a memory; and
   at least one processor coupled to the memory and configured to:
      determine that a first routing prefix of a first forwarding entry in a forwarding information base (FIB) is a less specific routing prefix than a second routing prefix in a second forwarding entry in the FIB;
      determine a first next hop of the first routing prefix is equal to a second next hop of the second routing prefix;
      remove the second forwarding entry from the FIB based on the determination that the first next hop of the first routing prefix is equal to the second next hop of the second routing prefix; and
      insert the first forwarding entry into a database based on a prefix length of the first routing prefix of the first forwarding entry.

9. The system of claim 8, wherein the first next hop comprises a next hop address and an outgoing interface.

10. The system of claim 8, wherein to insert the first forwarding entry, the at least one processor is configured to insert the first forwarding entry into the database based on the prefix length of the first routing prefix of the first forwarding entry being different than 24 bits or 32 bits, wherein the database comprises a longest prefix match (LPM) database.

11. The system of claim 8, wherein to insert the first forwarding entry, the at least one processor is configured to insert the first forwarding entry into the database based on the prefix length of the first routing prefix of the first forwarding entry being 24 bits or 32 bits, wherein the database comprises a longest exact match (LEM) database.

12. The system of claim 8, wherein the database comprises ternary content-addressable memory (TCAM).

13. The system of claim 8, wherein the at least one processor is further configured to generate a first sub routing prefix and a second sub routing prefix from a third routing prefix of a third forwarding entry in the FIB based on a prefix length of the third routing prefix being 23 bits.

14. The system of claim 13, wherein the at least one processor is further configured to insert the first sub routing prefix and the second sub routing prefix into the database.

15. A non-transitory computer-readable device having instructions stored thereon that, when executed by at least one computing device, causes the at least one computing device to perform operations comprising:
   determining that a first routing prefix of a first forwarding entry in a forwarding information base (FIB) is a less specific routing prefix than a second routing prefix in a second forwarding entry in the FIB;
   determining a first next hop of the first routing prefix is equal to a second next hop of the second routing prefix;
   removing the second forwarding entry from the FIB based on the determination that the first next hop of the first routing prefix is equal to the second next hop of the second routing prefix; and
   inserting the first forwarding entry into an exact match database based on a prefix length of the first routing prefix of the first forwarding entry being 24 bits or 32 bits.

16. The non-transitory computer-readable device of claim 15, wherein the inserting comprises inserting a third forwarding entry into a longest prefix match (LPM) database based on a prefix length of a third routing prefix of the third forwarding entry being different than 24 bits or 32 bits.

17. The non-transitory computer-readable device of claim 15, wherein the FIB is organized using a trie data structure.

18. The non-transitory computer-readable device of claim 16, wherein each of the exact match and LPM databases comprise ternary content-addressable memory (TCAM).

19. The non-transitory computer-readable device of claim 15, wherein the operations further comprise generating a first sub routing prefix and a second sub routing prefix from a third routing prefix of a third forwarding entry in the FIB based on a prefix length of the third routing prefix being 23 bits.

20. The non-transitory computer-readable device of claim 19, wherein the operations further comprise inserting the first sub routing prefix and the second sub routing prefix into the exact match database.

* * * * *